US012714158B2

(12) United States Patent
Crompton

(10) Patent No.: US 12,714,158 B2
(45) Date of Patent: Aug. 25, 2026

(54) UNDER-SUPPORT AND MOLDED BRA CUP

(71) Applicant: Sculpted U, Inc., West Palm Beach, FL (US)

(72) Inventor: Elizabeth A. Crompton, West Palm Beach, FL (US)

(73) Assignee: Sculpted U, Inc., West Palm Beach, FL (US)

( * ) Notice: Subject to any disclaimer, the term of this patent is extended or adjusted under 35 U.S.C. 154(b) by 0 days.

(21) Appl. No.: 18/974,366

(22) Filed: Dec. 9, 2024

(65) Prior Publication Data

US 2025/0098795 A1 Mar. 27, 2025

Related U.S. Application Data

(63) Continuation of application No. 17/905,789, filed as application No. PCT/US2021/021345 on Mar. 8, 2021, now Pat. No. 12,193,526.

(60) Provisional application No. 62/987,094, filed on Mar. 9, 2020.

(51) Int. Cl.

| | |
|---|---|
| ***A41C 3/12*** | (2006.01) |
| ***A41C 5/00*** | (2006.01) |
| ***B29C 43/18*** | (2006.01) |
| ***B29C 45/14*** | (2006.01) |
| *B29K 105/04* | (2006.01) |
| *B29L 31/48* | (2006.01) |

(52) U.S. Cl.

CPC .............. *A41C 3/128* (2013.01); *A41C 5/005* (2013.01); *B29C 43/184* (2013.01); *B29C 45/14311* (2013.01); *B29C 45/14819* (2013.01); *B29C 2043/182* (2013.01); *B29C 2043/189* (2013.01); *B29C 2045/14327* (2013.01); *B29K 2023/06* (2013.01); *B29K 2105/04* (2013.01); *B29L 2031/4885* (2013.01)

(58) Field of Classification Search

CPC .............. A41C 3/14; A41C 5/005; A41C 3/10

USPC ........................................................... 450/39

See application file for complete search history.

(56) References Cited

U.S. PATENT DOCUMENTS

| | | | |
|---|---|---|---|
| 3,030,633 | A | 4/1962 | Chalfin |
| 3,351,954 | A | 11/1967 | Chalfin et al. |
| 3,747,606 | A | 7/1973 | Tareau |

(Continued)

FOREIGN PATENT DOCUMENTS

| | | | |
|---|---|---|---|
| CH | 271095 | A | 10/1950 |
| FR | 70656 | E | 6/1959 |

(Continued)

OTHER PUBLICATIONS

International Search Report and Written Opinion issued in PCT/US2021/021345 dated Jul. 15, 2021, 16 pages.

(Continued)

*Primary Examiner* — Timothy K Trieu

(74) *Attorney, Agent, or Firm* — Rothwell, Figg, Ernst & Manbeck, P.C.

(57) ABSTRACT

The present disclosure provides for an under-support, which includes curved end portions and a support portion extending between the curved end portion. The support portion includes a plurality of openings. The present disclosure further provides for the under-support embedded in a foam cup. When the disclosed under-support is embedded in a foam cup, the foam extends through the openings in the support portion.

10 Claims, 8 Drawing Sheets

(56) References Cited

U.S. PATENT DOCUMENTS 4,235,240 A * 11/1980 Cousins ................. A41C 3/122 450/52
5,334,082 A 8/1994 Barker
6,186,862 B1 2/2001 Fildan
6,213,841 B1 4/2001 Kuo
6,324,703 B1 * 12/2001 Chen ..................... C08L 53/025 2/457
6,431,946 B1 * 8/2002 Fildan .................... A41C 3/122 450/41
6,575,881 B2 6/2003 Lapcevic
6,966,815 B2 * 11/2005 Weinerth ................. A41C 3/10 450/39
7,234,994 B2 6/2007 Fildan et al.
7,377,833 B1 5/2008 Wanzenboeck et al.
8,105,130 B2 1/2012 Fildan et al.
9,364,031 B2 6/2016 Crompton
9,993,038 B2 6/2018 Crompton
10,694,789 B2 6/2020 Crompton
11,412,786 B2 8/2022 Crompton
2007/0087659 A1 4/2007 Fildan et al.
2007/0087660 A1 4/2007 Fildan et al.
2011/0136405 A1 6/2011 Sturman et al.
2013/0137340 A1 5/2013 Liu
2013/0165017 A1 6/2013 Liu
2013/0295819 A1 11/2013 Liang
2014/0073221 A1 3/2014 Liu
2014/0073222 A1 3/2014 Turlan-Van Der Hoeven et al.
2016/0198775 A1 7/2016 Crompton
2017/0156413 A1 6/2017 Braverman
2018/0295893 A1 * 10/2018 Corley ................... A41C 3/146
2018/0352874 A1 * 12/2018 Cahan ...................... A41C 3/08
2019/0142079 A1 5/2019 Crompton
2020/0060356 A1 * 2/2020 Trangmar ............. A41C 5/005

FOREIGN PATENT DOCUMENTS

FR 2813167 A3 3/2002
GB 2493816 A 2/2013
KR 20100010553 U 10/2010
TW 201929704 A 8/2019
TW 202002821 A 1/2020
WO 2000047068 A1 8/2000
WO 2012/127151 A1 9/2012

OTHER PUBLICATIONS

U.S. Pat. No. 351,807, Skinner, issued on Nov. 2, 1886.
International Search Report and the Written Opinion of the International Searching Authority mailed Dec. 11, 2014, PCT/US2014/051843, 8 pgs.

* cited by examiner 100a
100b 120
504
121
502
100
110
111

138
132
510
151
134
130
512
100

111
110
120
132
130
526
524
528
121
530
532
134
100

121
120
130
123
514
516
518
113
100
111
110

UNDER-SUPPORT AND MOLDED BRA CUP

RELATED APPLICATIONS

This application is a Continuation of U.S. patent application Ser. No. 17/905,789, filed Sep. 7, 2022, which is a National Phase of International Patent Application No. PCT/US2021/021345, filed Mar. 8, 2021, claiming benefit from U.S. Patent Application No. 62/987,094, filed Mar. 9, 2020, the disclosures of which are incorporated herein in their entirety by reference, and priority is claimed to each of the foregoing.

FIELD

The present disclosure relates to bra cups, bra under-supports, and methods for manufacturing.

BACKGROUND

Presented below is background information on certain aspects of the present invention as they may relate to technical features referred to in the detailed description, but not necessarily described in detail. That is, certain components of the present invention may be described in greater detail in the materials discussed below. The discussion below should not be construed as an admission as to the relevance of the information to the claimed invention or the prior art effect of the material described.

A brassiere consists of two cups for breasts, a center panel, a band running around the torso under the breasts, and shoulder straps (some brassieres are strapless). Brassieres are typically constructed of a fabric such as cotton, polyester, or the like. Most commonly, brassieres are designed to simply restrain the breasts from movement, especially movement during physical activity. It is important for a bra to be comfortable, given the lengthy period of time each day that the bra is worn. Unfortunately, conventional brassieres are designed to hold breasts, as compared with supporting the breasts. Conventional brassieres can cause discomfort to the wearer during movement, and a poorly-fitted bra can actually cause physical pain to the wearer. Furthermore, conventional brassieres do not mitigate physical challenges that a person encounters from breast tissue; for example, the weight of breast tissue can cause back pain, muscle strains, physical discomfort, and other health complications.

Wearers who have undergone breast augmentation have a unique set of challenges. Breast implants are manufactured in a range of sizes. After surgery, the subject will experience a new awareness due to the weight and positioning of the implant. This is especially noticeable directly after the enhancement. The weight of the implant is dependent upon the size of the implant and its positioning may vary from quite close to a wider proximity to the other breast. Wearers who have under gone breast augmentation typically employ a conventional brassiere, which can lead to discomfort or pain.

The cups on most brassieres, including pushup bras, are supported by underwires made of metal, which sometimes may be coated in plastic. Strapless brassieres typically rely on support provided by the band and underwire positioned under the bust. It is well known that there are a wide variety of underwire bras. The lower edge of the bra cup is lined with the underwire. Typically, the underwire is secured in the bra cup with channeling, where the underwire is sewn into a seam at a lower edge of the bra cup.

Most of the existing underwires in the art are made by bending a metal strip into a semi-circular shape or having the semi-circular underwire constructed in advance of a comparatively stiff material. However, the planar configuration of the underwire is rarely consistent with the hemispherical shape of the cup and the bottom portion of a breast which in turn creates an underwire with inadequate support. Should the underwire exert extreme pressure, it may actually have an impact on the breast implant under the skin and very noticeable indentations and severe pain may be experienced with use of such underwire bras. In some cases, repeated use could eventually cause implant failure in a wearer with breast augmentation. While some underwires may be relatively flexible to assume the shape imparted on by the wearer's body and bra, this relative flexibility may also compromise the relative support needed beneath the breast.

While the underwires of the prior art have achieved widespread usage, certain disadvantages result from their use. These disadvantages relate to the varying degrees of stiffness encountered following construction of the underwire. The relative stiffness of conventional underwires causes discomfort and the uniformity of stiffness provides a lack of adaptability to the needs of various users. Other underwires possess a constant cross-section throughout their length and so do not provide a desired variable level of support as the weight of the breast is not evenly dispersed. Further when a desired cleavage effect (upwardly to the neckline and inwardly toward the opposite breast) is wanted, underwires fail to provide an essential support along a greater surface area of the breast. Other disadvantages relate to the positioning of the underwire within the band of the brassiere. A very specific disadvantage occurs when the underwire within the band does not provide sufficient support to a wearer who had breast augmentation as it does not capture and hold the breast, more specifically the implant, in a position that upwardly lifts and maintains the breast. Additionally, conventional underwires are sewn into a seam in the bra cup, which further restricts movement of the underwire when the wearer moves.

Further, conventional underwires are tightly pressed against a wearer's chest. Research suggests that this tight restriction of the breast tissue restricts lymph flow of the lymphatic system under the breast tissue. This can lead to the accumulation of fluid and harmful products, potentially contributing to pain, tender lumps, cysts or cancer.

Previously-disclosed under-supports for a bra, designed to address the inadequacies of underwire support bras for women with breast implants, included a supporting section and an anchor. Exemplary supporting sections were protrusions from a curved base, and exemplary anchors were thin, flat members with a plurality of openings throughout the anchor. An anchor was mechanically coupled to an under-support, and then encased in foam to form a bra cup.

However, such an under-support presents a number of financial and technological manufacturing disadvantages when integrating the under-support into a bra cup. As an initial matter, the under-support required two separate pieces to be manufactured and adhered to each other (e.g., the under-support and the anchor). Because consumer bra cups require different sizes and shapes, creating a bra with an under-support could require manufacturing of four pieces per bra size (e.g., the right bra cup under-support, the right bra cup anchor, the left bra cup under-support, and the left bra cup anchor), which could be prohibitively expensive, time-consuming, and create multiple opportunities for error.

Furthermore, conventional bra cups are often formed by compression molding processes, which place a pre-formed solid foam into a mold, and compress the foam into a desired bra cup shape. Compression molding processes do not integrate under-support into the foam itself; instead, under-supports are separately adhered to the foam. Compression molding processes have a variety of drawbacks themselves; notably, compression molded bra cups tend to expand or shrink back to the original shape of the foam, and deform the bra cup over time. This change in the foam shape of a bra cup causes discomfort to the wearer, and the discomfort is worsened if the foam near the under-support is deformed or thinned to further expose the under-support to the wearer's breast tissue. In addition, the under-support can shift or move within the cavity between the top layer and bottom layer of memory foam over time. This causes discomfort because the under-support will no longer be properly positioned under the wearer's breast.

In some examples, conventional bra cups are formed by injection molding processes. Previously described under-supports have a support portion with a much greater thickness than the corresponding anchor portions. This is problematic, because, in injection molding, the liquid material injected into the mold is not foam; the material becomes foam when an endothermic reaction in the hot mold activates the agents in the foam to result in an expanded foam shape, taking the shape of the mold. Therefore, injection molding requires a relatively even temperature among the liquid material in the mold in order for the endothermic reaction to properly take place. However, a thicker portion of the liquid material, such as the liquid that would be surrounding a thicker under-support support portion, retains heat and will take longer to cool than a thinner portion of the liquid material, such as the liquid that would be surrounding a thinner anchor. This difference in cooling time throughout the liquid would disturb the endothermic reaction and result in an improperly formed foam cup. Conventional injection molding processes thus require the use cooling plates or a two-shot injection molding process form a molded bra cup.

SUMMARY

The various examples of the present disclosure are directed towards an under-support, which includes a first curved end portion, a second curved end portion, and a support portion. The first curved end portion is curved along a first radius and the second curved end portion is curved along a second radius. The second radius is smaller than the first radius and a length of the second curved end portion is substantially similar to a length of the first curved end portion. The support portion extends between the first curved end portion and the second curved end portion. The support portion comprises a concave edge, a convex edge, and a plurality of openings throughout the support portion.

In one embodiment, the present disclosure provides for a molded bra cup, which includes the described under-support and an injection molded foam cup.

In another embodiment, the present disclosure provides for a method of forming a molded bra cup. The method provides for placing the described under-support in a mold. The method then provides for injecting, in one shot, liquid material into the mold. After the liquid material has cooled to form a solid foam, the method provides for removing the solid foam from the mold.

In another embodiment, the present disclosure provides for a molded bra cup, which includes the described under-support which has been heat compressed between a first solid foam and a second solid foam.

In another embodiment, the present disclosure provides a method of forming a molded bra cup, the method comprising compressing the described under-support between a first solid foam and a second solid foam at an elevated temperature (e.g., about 200 degrees Celsius) for a period of time (e.g., about one minute, about two minutes, about three minutes, about three and a half minutes or more), and then allowing the molded bra cup to cool.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The accompanying drawings exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

DETAILED DESCRIPTION

Figure 1A:
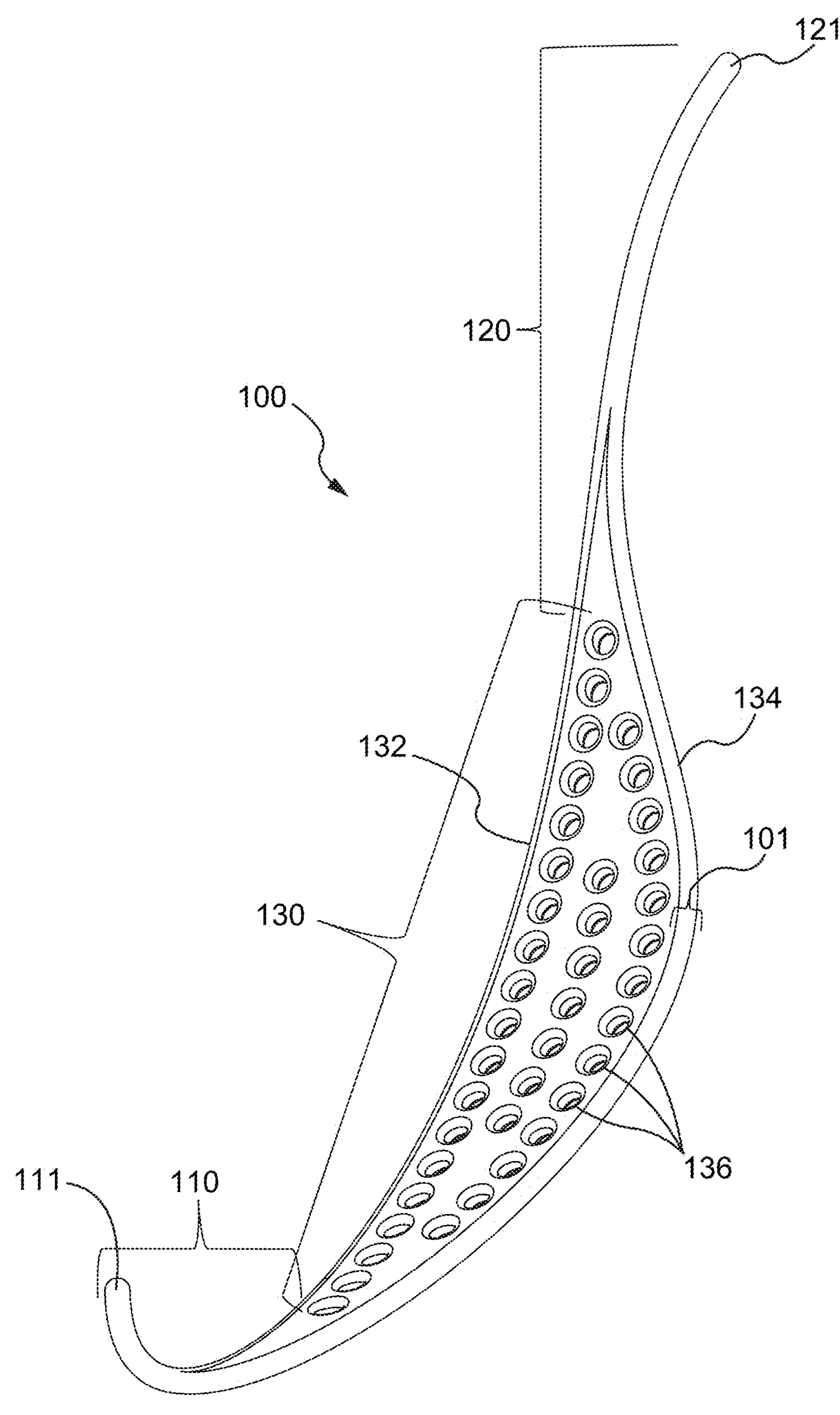
FIG. 1A shows an exemplary under-support, according to an embodiment of the present disclosure.

The present invention is described with reference to the attached figures, where like reference numerals are used throughout the figures to designate similar or equivalent elements. The figures are not drawn to scale, and are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details, or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The terminology used herein is for the purpose of describing particular examples only and is not intended to be limiting of the invention. As used herein, the singular forms “a,” “an,” and “the” are intended to include the plural forms as well, unless the context clearly indicates otherwise. Furthermore, to the extent that the terms “including,” “includes,” “having,” “has,” “with,” or variants thereof, are used in either the detailed description and/or the claims, such terms are intended to be inclusive in a manner similar to the term “comprising.” Additionally, the term “about” includes a variation of at least 10%.

Unless otherwise defined, all terms (including technical and scientific terms) used herein have the same meaning as commonly understood by one of ordinary skill in the art to which this invention belongs. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

In view of the afore-mentioned deficiencies in prior art designs for bras which address the special needs of users having breast implants (but is widely beneficial for any wearer, male or female, with breast tissue, and with or without a breast implant), the present disclosure provides a design that utilizes specialized injection and thermocompression molding processes and materials. This design may be beneficial to both individuals with augmented breasts and individuals with natural breasts. FIGS. 1A-1D show a novel under-support 100, according to an embodiment of the present disclosure. Similar reference labels in any of FIGS. 1A-1D refer to corresponding elements.

FIG. 1A shows a relatively top view of under-support 100, according to an embodiment of the present disclosure. For example, FIG. 1A shows a view where the under-support is rotated towards a viewer. Under-support 100 includes a first curved end portion 110, a second curved end portion 120, and a support portion 130. Under-support 100 is an under-support for left breast tissue. An under-support for right breast tissue is a mirror image of under-support 100.

The first curved end portion 110 is shaped to extend along a medial portion of the wearer’s chest. That is, the first curved end portion 110 is closer to a sternum than to an axilla (armpit) of the wearer. The second curved end portion 120 is shaped to extend along a lateral, axillary portion of the wearer’s chest. That is, the second curved end portion 120 is closer to an axilla than to a sternum of the wearer.

The support portion 130 extends between the first curved end portion 110 and the second curved end portion 120. Support portion 130 comprises a concave edge 132, a convex edge 134 (shown further in FIG. 1C), and a plurality of openings 136 throughout the support portion 130.

The under-support 100 has a width 101, which is substantially constant from a tip 111 of the first end portion 110 to a tip 121 of the second end portion 120. For example, the width 101 of the under-support 100 varies by 1 millimeter or less along a length of the under-support 100. In some examples, the width 101 is about 0.1 inches. In some examples, the width 101 is about 2.75 millimeters. For example, the first curved end portion 110 and the second curved end portion 120 is substantially tubular, with a diameter of about 0.1 inches. For example, the first curved end portion 110 and the second curved end portion 120 have a diameter of about 2.75 millimeters.

In some embodiments of the present disclosure, under-support 100 is made from a single material. In some embodiments, the under-support 100 is made from a flexible, non-metal material, capable of withstanding high temperature processing. For instance, the flexible, non-metal material is able to withstand the specialized injection and thermocompression molding processes described herein, at temperatures of about 200 degrees Celsius. For example, under-support 100 is made of a polypthalamide (PPA). For example, Ultramid Advance N or Ultramid Advance N4Z is used. For example, the polypthalamide has a long alkyl chain. A polypthalamide with a long alkyl chain has high stability of its physical characteristics between −40° C. to greater than 100° C., preferably greater than 200° C. The material has a low water uptake, high dimensional stability, high chemical resistance, and is easier to process compared to other PPAs.

A polypthalamide has greater flexibility than the metal used in conventional underwires. This flexibility allows a bra cup with the under-support 100 to move more naturally with the wearer’s body during everyday movement. Additionally, the greater flexibility allows for the integration of the disclosed under-support into sports bras; conventional sports bras cannot use conventional underwires because of the high discomfort of the relatively rigid wire during heavy physical exertion.

Figure 1B:
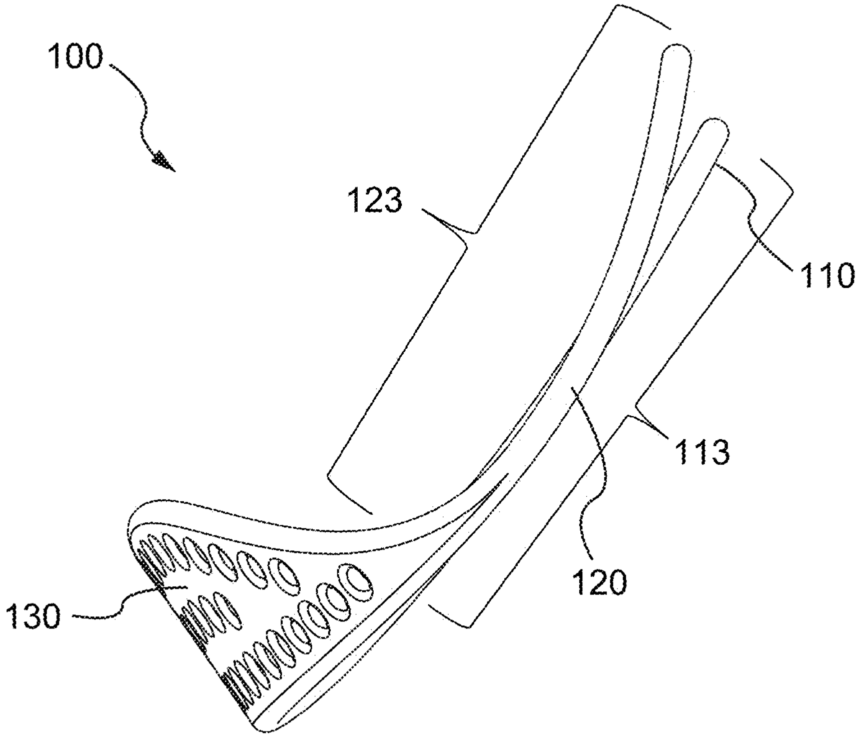
FIG. 1B shows a side view of the exemplary under-support, according to an embodiment of the present disclosure.

FIG. 1B shows a side view of the under-support 100. In some examples, first curved end portion 110 has a substantially similar length 113 to a length 123 of second curved end portion 120. In some examples, length 113 and 123 are within a centimeter of each other. In some examples, length 113 and 123 are within two centimeters of each other. In some examples, lengths 113 and 123 are slightly shorter than a height of the wearer’s breast. In some examples, first curved end portion 110 has a longer length than second curved end portion 120.

Figure 1C:
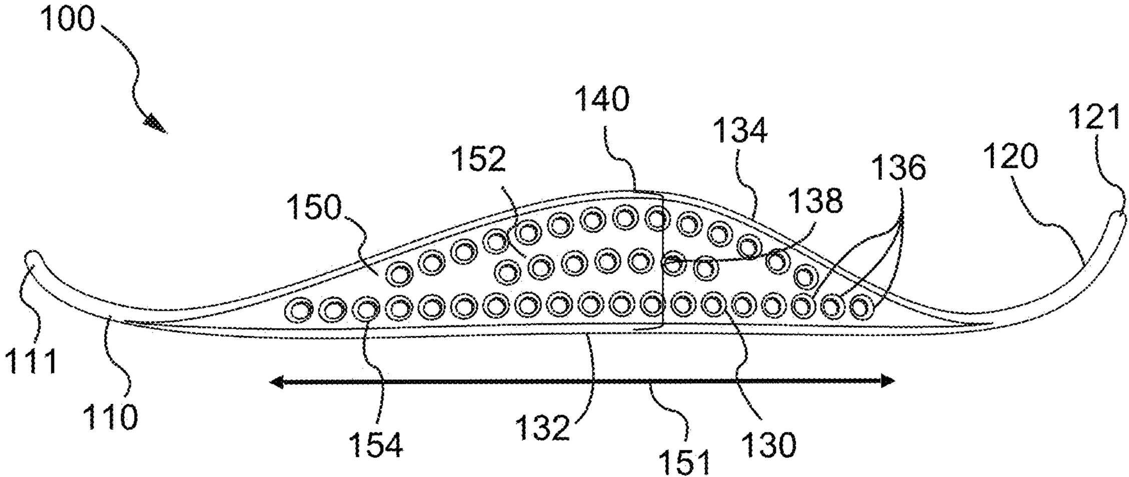
FIG. 1C shows a bottom view of the exemplary under-support, according to an embodiment of the present disclosure.
Figure 1D:
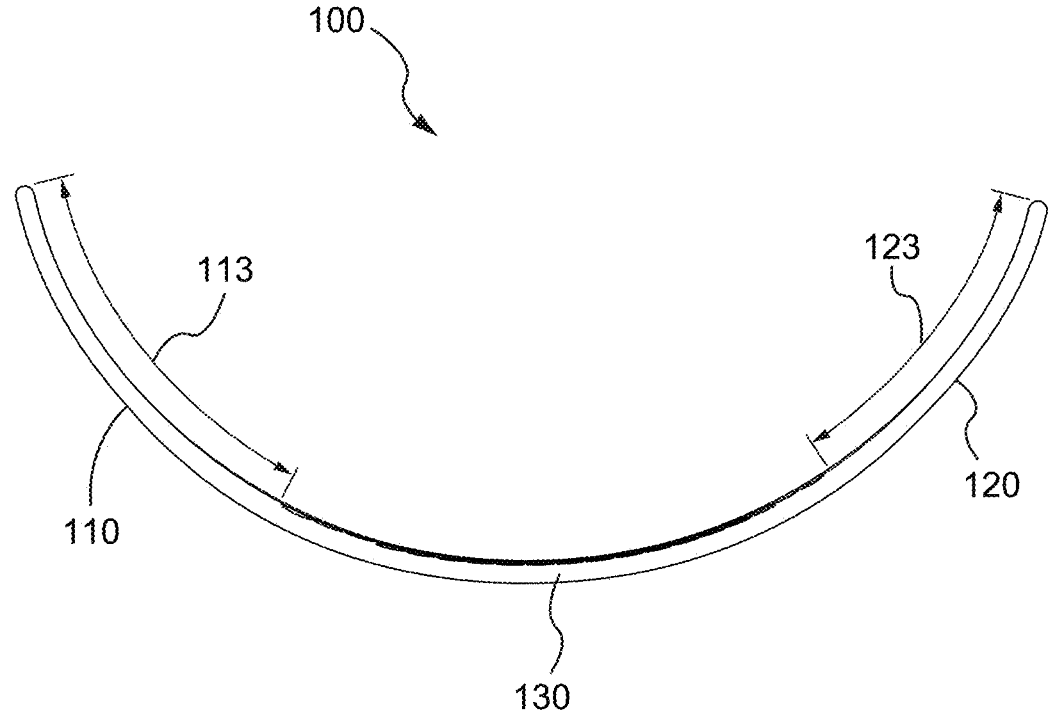
FIG. 1D shows a side view of the exemplary under-support, according to an embodiment of the present disclosure.

Turning briefly to FIG. 1D, an example is shown where second curved end portion 120 has a shorter length 123 than the length 113 of first curved end portion 110.

In some examples, when the breast cup size is a B-cup, length 123 about 1.5 to 2.5 inches, preferably 1.75 to 2.25, and most preferably about 2 inches, and length 113 is about 2 to 3 inches, preferably about 2.25 to 2.75 inches, and most preferably about 2.5 inches. In some examples, when the breast cup size is a B-cup, length 123 is about 41 millimeters to 61 millimeters, preferably about 46 millimeters to 56 millimeters, and most preferably about 51 millimeters. In some examples, when the breast cup size is a B-cup, length 113 is about 50 millimeters to 70 millimeters, preferably about 55 millimeters to 65 millimeters, and most preferably about 60 millimeters.

In some examples, when the breast cup size is a C-cup, length 123 about 2 to 3 inches, preferably about 2.25 to 2.75 inches, and most preferably about 2.5 inches, and length 113 is about 2.3 to 3.3 inches, preferably about 2.55 to 3.05 inches, and most preferably about 2.8 inches. In some examples, when the breast cup size is a C-cup, length 123 is about 55 millimeters to 75 millimeters, preferably about 60 millimeters to 70 millimeters, and most preferably about 65 millimeters. In some examples, when the breast cup size is a C-cup, length 113 is about 63 millimeters to 83 millimeters, preferably about 68 millimeters to 78 millimeters, and most preferably about 73 millimeters.

In some examples, when the breast cup size is a D-cup, length 123 about 2.5 to 3.5 inches, preferably about 2.75 to 3.25 inches, and most preferably about 3 inches, and length 113 is about 2.9 to 3.9 inches, preferably about 2.15 to 3.65 inches, and most preferably about 3.4 inches. In some examples, when the breast cup size is a D-cup, length 123 is about 65 millimeters to 85 millimeters, preferably about 70 millimeters to 80 millimeters, and most preferably about 75 millimeters. In some examples, when the breast cup size is a D-cup, length 113 is about 75 millimeters to 95 millimeters, preferably about 80 millimeters to 90 millimeters, and most preferably about 85 millimeters.

In some examples, when the breast cup size is an E-cup, length 123 about 2.7 to 3.7 inches, preferably about 2.95 to 3.45 inches, and most preferably about 3.2 inches, and length 113 is about 3.5 to 4.5 inches, preferably about 3.74 to 4.25 inches, and most preferably about 4 inches. In some examples, when the breast cup size is an E-cup, length 123 is about 73 millimeters to 93 millimeters, preferably about 78 millimeters to 88 millimeters, and most preferably 83 millimeters. In some examples, when the breast cup size is an E-cup, length 113 is about 90 millimeters to 110 millimeters, preferably about 95 millimeters to 105 millimeters, and most preferably 100 millimeters.

Turning back to FIG. 1B, in some examples, the first curved end portion 110 is curved along a first radius and second curved end portion 120 is curved along a second radius. The second radius is smaller than the first radius, such that second curved end portion 120 has a higher degree of curvature than first curved end portion 110.

Turning now to FIG. 1C, a bottom view of under-support 100 is shown. The concave edge 132 of the support portion 130 has a slight curvature while the convex edge 134 of the support portion 130 has a greater curvature. For example, concave edge 132 will be adjacent to a wearer's chest, and consequently the curvature can correspond to a curvature of a wearer's ribcage. The convex edge 134 has an elongated curved shape, where a greatest width 138 of the convex edge 134 is at a pole 140 of the support portion 130. In some examples, the support portion 130 is asymmetric; that is, a distance from the pole 140 to the second curved end portion 120 is less than a distance from the pole 140 to the first curved end portion 110.

When the under-support 100 is worn by a user (i.e., when the under-support 100 is configured in a left bra cup), the pole 140 is positioned in the left bra cup to be in a line with the wearer's left nipple and a position on a right-side half of the wearer's right collarbone. Therefore, the under-support 100 is not centered directly under the wearer's nipple, in contrast to the positioning of conventional underwires in conventional bras. Rather, under-support 100 is positioned more along a lateral side of the wearer's chest. The difference in lengths of the first curved end portion 110 and second curved end portion 120 as shown and discussed regarding FIG. 1D ensures stable positioning of the under-support 100 at this position.

This positioning provides advantages over conventional bras. Breast tissue in conventional bras falls over the underwire and must be pulled up by the bra strap. Further, the weight of the breast tissue often stretches out the skin because conventional bra straps do not provide sufficient support. A bra with an under-support 100 configured according to the present disclosure (1) distributes a weight of the breast tissue (and/or a breast implant, if the wearer has an implant) along the supporting section 130 which lessens the weight held by the bra straps and/or bra band and (2) lifts the breast tissue and/or the breast implant towards a wearer's sternum. In examples where a wearer has just had an implant surgery, a bra with under-support 100 supports the implants as they settle into the pocket made by the surgeon. Accordingly, bras with under-support 100 allow increased circulation of the lymphatic system under the breast tissue and/or the breast implant. Further, this distribution of weight reduces the pressure points of a bra band along a wearer's rib cage.

This positioning provides additional advantages for wearers with breast implants. In some cases, wearers have submuscular implants, where a breast implant is placed under a wearer's pectoral muscle. Wearers flex their pectoral muscles frequently during everyday movement (e.g., opening the fridge door, picking up an object) and even more frequently during physical exercise. When the pectoral muscle is flexed, the implant is pushed down the wearer's chest and out towards the wearer's axilla. This can cause severe discomfort for the wearer. The disclosed under-support 100 reduces movement of the implant into the wearer's axilla because the implant is caught against the supporting portion 130. This is particularly the case when the under-support 100 is positioned in a line with the wearer's nipple and a position on an opposing half of the wearer's opposing collarbone. This reduction of movement further maintains the elasticity of the wearer's breast tissue skin.

The disclosed position provides similar advantages for wearer's with subglandular implants. Subglandular implants are placed over the pectoral muscles. Because subglandular implants are unrestrained by the pectoral muscles, the implants have a greater subjectivity to gravity (e.g., sagging of the breast tissue) and lateral movement than submuscular implants. The disclosed under-support 100 reduces this movement and maintains the elasticity of the wearer's breast tissue skin.

In some examples, as shown in FIG. 1C, the plurality of openings include a first row 150 of openings 136 along the convex edge 140, a second row 154 of openings 136 along the concave edge 132, and a third row 152 of openings 136 between the first row 150 and the second row 154. This arrangement of openings 136 provides consistent structural support of the under-support 100 when integrated into a foam cup, as discussed further below regarding FIGS. 2-4B. In some examples, the openings 136 are less than 50% of the surface area of the under-support 100. In some examples, the number of openings 136 in row 150 is greater than the number of openings in row 152. In some examples, the number of openings 136 in row 150 is greater than the number of openings in row 154. In some examples, the diameter 512 of the openings 136 is about 2.5 to 3.5 millimeters, preferably about 2.75 to 3.25 millimeters, and most preferably about 3 millimeters. The plurality of openings 136 may include any number of openings 136, and the present disclosure generally is not limited to a specific number of openings 136 or a particular arrangement or placement of the openings 136 on the under-support 100. Furthermore, the present disclosure is not limited to a specific shape of the openings 136. For instance, in addition to having a circular shape, the openings 136 may also comprise any one of the following shape: oval, triangular, square, rectangular, ellipse, or polygonal. The present disclosure further contemplates that the plurality of openings 136 may comprise some openings having a first shape and some openings having a second shape. The present disclose is also not limited by the size of each of the plurality of openings 136, and contemplates that the plurality of openings 136 may comprise different-sized openings.

Further, the support portion 130 comprises a length 151. Length 151 varies based on any of: a breast cup size of the wearer, a weight of the wearer, a height of the wearer, a chest circumference of the wearer, and any other measurement metrics of the wearer's chest. In some examples, if the breast cup size is a B-cup, the length 151 is about 3 inches to 4 inches, more preferably about 3.25 to 3.75 inches, and most preferably about 3.5 inches. In some examples, if the breast cup size is a C-cup, the length 151 is about 3.6 inches to 4.6 inches, more preferably about 3.85 to 4.35 inches, and most preferably about 4.1 inches. In some examples, if the breast cup size is a D-cup, the length 151 is about 4.1 inches to 5.1 inches, more preferably about 4.35 to 4.85 inches, and most preferably about 4.6 inches. In some examples, if the breast cup size is a E-cup, the length 151 is about 4.1 inches to 5.1 inches, more preferably about 4.35 to 4.85 inches, and most preferably about 4.6 inches.

Under-support 100 provides a number of manufacturing and technological advantages compared to previously-disclosed under-supports. As an initial matter, under-support 100 is a single component providing both support and anchoring to a foam exterior (discussed further regarding FIGS. 2-4B). Therefore, under-support 100 reduces the number of pieces that must be manufactured for each bra, and eliminates the need to separately couple an anchor to a previously-disclosed under-support. Additionally, the width of support portion 130 provides physical support for breast tissue and/or the breast implant. The lengths of the curved end portions 110 and 120 further serve to center and properly position the support portion 130 under the wearer's breast tissue and/or the breast implant. Furthermore, the supporting portion 130 provides a larger surface area for support compared to previously-disclosed under-supports. The larger surface area of the supporting portion 130 further distributes the weight of the breast tissue and/or the breast implant, reducing the pressure on the bra straps and the breast tissue skin.

Figures 5A, 5B, 5C, 5D, 5E:
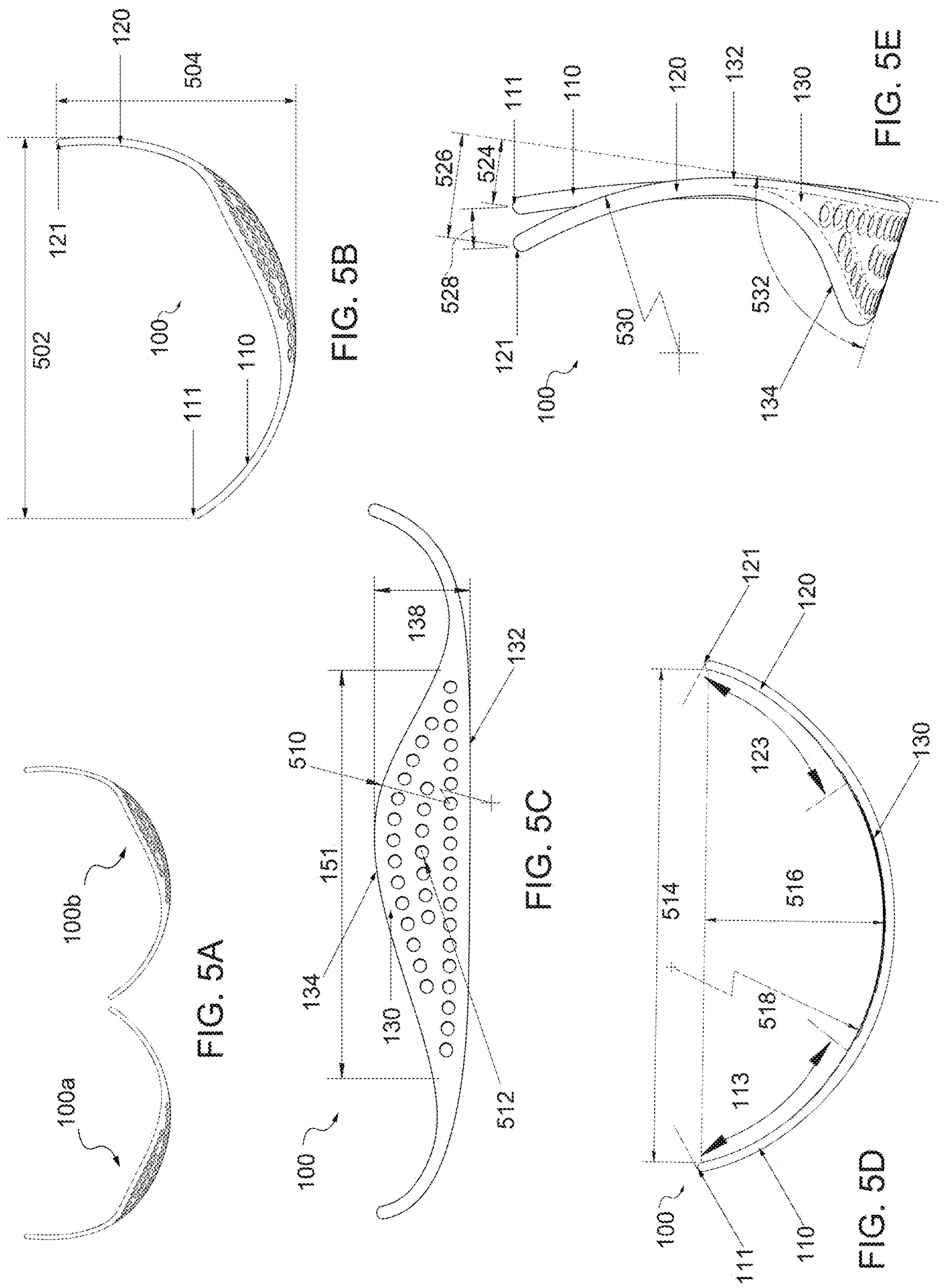
FIG. 5A shows a front view of a right under-support and a left under-support, according to an embodiment of the present disclosure.
FIG. 5B shows exemplary sizing proportions of a front view of a left under-support, according to an embodiment of the present disclosure.
FIG. 5C shows exemplary sizing proportions of a bottom view of an under-support, according to an embodiment of the present disclosure.
FIG. 5D shows exemplary sizing proportions of a side view of an under-support, according to an embodiment of the present disclosure.
FIG. 5E shows exemplary sizing proportions of a side view of an under-support, according to an embodiment of the present disclosure.

FIGS. 5A-5E show exemplary dimensions of the under-support 100. FIG. 5A shows a front view of a right under-support 100*a* and a left under-support 100*b*, wherein the right under-support 100*a* is a mirror image of the left under-support 100*b*.

As shown in FIG. 5B, when the under-support 100 is positioned within the bra cup and worn by a user, the under-support 100 exhibits a lateral distance 502 between the tip 111 of the first end portion 110 and the tip 121 of the second end portion 120 and a height 504. In some examples, when the breast cup size is a B-cup, distance 502 is about 4.5 to 6.5 inches, preferably about 5.0 to 6.0 inches, and most preferably about 5.5 inches, and height 504 is about 2.5 to 4.5 inches, preferably about 3.0 to 4.0 inches, and most preferably about 3.5 inches. In some examples, when the breast cup size is a C-cup, distance 502 is about 5.4 to 7.4 inches, preferably about 6.0 to 7.0 inches, and most preferably about 6.4 inches, and height 504 is about 3.0 to 5.0 inches, preferably about 3.5 to 4.5 inches, and most preferably about 4.1 inches. In some examples, when the breast cup size is a D-cup, distance 502 is about 5.6 to 7.6 inches, preferably about 6.0 to 7.0 inches, and most preferably about 6.6 inches, and height 504 is about 3.2 to 5.2 inches, preferably about 3.8 to 4.6 inches, and most preferably about 4.2 inches. In some examples, when the breast cup size is a E-cup, distance 502 is about 6.6 to 8.6 inches, preferably about 7.0 to 8.0 inches, and most preferably about 7.6 inches, and height 504 is about 3.5 to 5.5 inches, preferably about 4.0 to 4.5 inches, and most preferably about 4.3 inches.

FIG. 5C shows a bottom view of the under-support 100, wherein the length 151 and greatest width 138 of the support portion 130 have the same dimensions as those set forth above in the description of FIG. 1C. The convex edge 134 of the support portion 130 has a curvature radius 510. In some examples, when the breast cup size is a B-cup, radius 510 is about 1.6 to 2.0 inches, preferably about 1.7 to 1.9 inches, and most preferably about 1.8 inches. In some examples, when the breast cup size is a C-cup, radius 510 is about 1.8 to 2.2 inches, preferably about 1.9 to 2.1 inches, and most preferably about 2.0 inches. In some examples, when the breast cup size is a D-cup, radius 510 is about 2.1 to 2.5 inches, preferably about 2.2 to 2.4 inches, and most preferably about 2.3 inches. In some examples, when the breast cup size is a E-cup, radius 510 is about 2.3 to 2.7 inches, preferably about 2.4 to 2.6 inches, and most preferably about 2.5 inches.

FIG. 5D shows a side view aligned with the internal curvature of under-support 100, wherein the length 113 of the first curved end portion 110 and the length 123 of the second curved end portion 123 have the same dimensions as those set forth above in the description of FIG. 1D. The under-support 100 further comprises a distance 514 between tips 111 and 121, a distance 516 from the support portion 130 to the height of the tips 111 and 121, and an internal curvature radius 518.

In some examples, when the breast cup size is a B-cup, distance 514 is about 5.0 to 7.0 inches, preferably about 5.5 to 6.5 inches, and most preferably about 6.0 inches. In some examples, when the breast cup size is a C-cup, distance 514 is about 6.0 to 8.0 inches, preferably about 6.5 to 7.5 inches, and most preferably about 7.0 inches. In some examples, when the breast cup size is a D-cup, distance 514 is about 7.0 to 9.0 inches, preferably about 7.5 to 8.5 inches, and most preferably about 8.0 inches. In some examples, when the breast cup size is a E-cup, distance 514 is about 8.0 to 10.0 inches, preferably about 8.5 to 9.5 inches, and most preferably about 9.0 inches.

In some examples, when the breast cup size is a B-cup, distance 516 is about 2.0 to 2.4 inches, preferably about 2.1 to 2.3 inches, and most preferably about 2.2 inches. In some examples, when the breast cup size is a C-cup, distance 516 is about 2.3 to 2.7 inches, preferably about 2.4 to 2.6 inches, and most preferably about 2.5 inches. In some examples, when the breast cup size is a D-cup, distance 516 is about 2.7 to 3.1 inches, preferably about 2.8 to 3.0 inches, and most preferably about 2.9 inches. In some examples, when the breast cup size is a E-cup, distance 516 is about 3.2 to 3.6 inches, preferably about 3.3 to 3.5 inches, and most preferably about 3.4 inches.

In some examples, when the breast cup size is a B-cup, radius 518 is about 3.0 to 3.4 inches, preferably about 3.1 to 3.3 inches, and most preferably about 3.2 inches. In some examples, when the breast cup size is a C-cup, radius 518 is about 3.6 to 4.0 inches, preferably about 3.7 to 3.9 inches, and most preferably about 3.8 inches. In some examples, when the breast cup size is a D-cup, radius 518 is about 4.2 to 4.6 inches, preferably about 4.3 to 4.5 inches, and most preferably about 4.4 inches. In some examples, when the breast cup size is a E-cup, radius 518 is about 4.6 to 5.0 inches, preferably about 4.7 to 4.9 inches, and most preferably about 4.8 inches.

FIG. 5E shows a side view of under-support 100, wherein the under-support 100 comprises a first tip distance 524 between tip 111 and the bottom of the support portion 130, a second tip distance 526 between tip 121 and the bottom of the support portion 130, distance 528 between tips 111 and 121, a curvature radius 530 of the concave edge 132 of the support portion 130, and an angle 532. Across all breast cup sizes, angle 532 is about 60 to 100 degrees, preferably about 70 to 90 degrees, and most preferably about 80 degrees.

In some examples, when the breast cup size is a B-cup, the first tip distance 524 is about 0.2 to 0.6 inches, preferably about 0.3 to 0.5 inches, and most preferably about 0.4 inches, and the second tip distance 526 is about 0.4 to 0.8 inches, preferably about 0.5 to 0.7 inches, and most preferably about 0.6 inches. In some examples, when the breast cup size is a C-cup, the first tip distance 524 is about 0.2 to 0.6 inches, preferably about 0.3 to 0.5 inches, and most preferably about 0.4 inches, and the second tip distance 526 is about 0.5 to 0.9 inches, preferably about 0.6 to 0.8 inches, and most preferably about 0.7 inches. In some examples, when the breast cup size is a D-cup, the first tip distance 524 is about 0.3 to 0.7 inches, preferably about 0.4 to 0.6 inches, and most preferably about 0.5 inches, and the second tip distance 526 is about 0.6 to 1.0 inches, preferably about 0.7 to 0.9 inches, and most preferably about 0.8 inches. In some examples, when the breast cup size is a E-cup, the first tip distance 524 is about 0.4 to 0.8 inches, preferably about 0.5 to 0.7 inches, and most preferably about 0.6 inches, and the second tip distance 526 is about 0.7 to 1.1 inches, preferably about 0.8 to 1.0 inches, and most preferably about 0.9 inches.

In some examples, when the breast cup size is a B-cup, distance 528 is about 0.1 to 0.4 inches, preferably about 0.2 to 0.3 inches, and most preferably about 0.25 inches. In some examples, when the breast cup size is a C-cup, distance 528 is about 0.1 to 0.4 inches, preferably about 0.2 to 0.3 inches, and most preferably about 0.29 inches. In some examples, when the breast cup size is a D-cup, distance 528 is about 0.2 to 0.5 inches, preferably about 0.3 to 0.4 inches, and most preferably about 0.35 inches. In some examples, when the breast cup size is a E-cup, distance 528 is about 0.2 to 0.5 inches, preferably about 0.3 to 0.4 inches, and most preferably about 0.4 inches.

In some examples, when the breast cup size is a B-cup, the curvature radius 530 is about 2.3 to 2.7 inches, preferably about 2.4 to 2.6 inches, and most preferably about 2.5 inches. In some examples, when the breast cup size is a C-cup, the curvature radius 530 is about 2.9 to 3.3 inches, preferably about 3.0 to 3.2 inches, and most preferably about 3.1 inches. In some examples, when the breast cup size is a D-cup, the curvature radius 530 is about 3.5 to 3.9 inches, preferably about 3.6 to 3.8 inches, and most preferably about 3.7 inches. In some examples, when the breast cup size is a E-cup, the curvature radius 530 is about 4.1 to 4.5 inches, preferably about 4.2 to 4.4 inches, and most preferably about 4.5 inches.

Figure 2A:
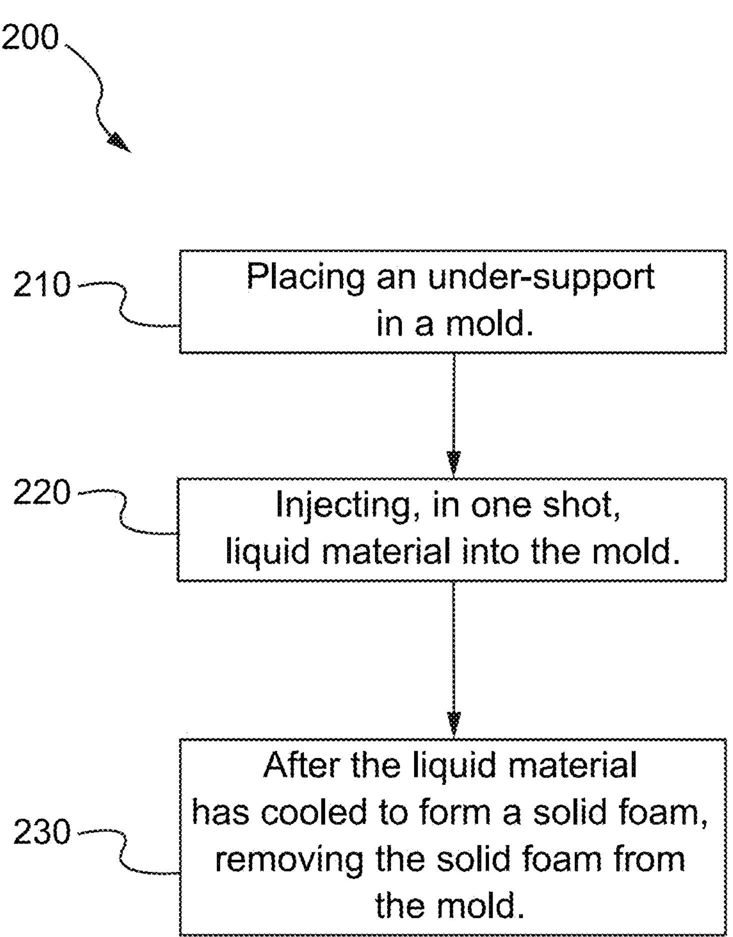
FIG. 2A shows an exemplary methodology, according to an embodiment of the present disclosure.

The present disclosure further provides a method 200 for forming an injection molded bra cup, as shown in FIG. 2A.

Step 210 of method 200 provides for placing an under-support in a mold. For example, the under-support is under-support 100 as described above. In some examples, the mold is one or more metal mold plates.

In some examples, the under-support is made of a polypthalamide, preferably a long alkyl chain polypthalamide. The under-support material has a melt temperature of greater than about 100° C., preferably greater than about 200° C., most preferably greater than about 300° C. For example, the material has a melt temperature of about 310° C. to 340° C. and a mold temperature of about 80° C. to 160° C. Therefore, such a material has high melt stability and flowability and is ideal for the disclosed method 200.

In some examples of step 210, a release agent is sprayed into the mold to facilitate the release of the part. In some examples, a material is added and molded into the part to help facilitate the release.

In some examples of step 210, a filler is added to the mold to add strength or hardness to the finished product.

Step 220 of method 200 then provides for injecting, in one shot, liquid material into the mold. In some examples, the liquid material has a temperature of at least 200 degrees Celsius. In some examples, the temperature is up to 300 degrees Celsius. For example, the liquid material comprises an ethylene based polyolefin elastomer.

In some examples of step 220, the liquid material maintains high heat in the mold for several minutes (e.g., the liquid material may maintain a heat of 200 degrees Celsius for at least three minutes).

In some examples, the liquid material contains one or more of: additives or colorants. For example, additives are used to modify the overall performance and appearance of a finished product. For example, additives are made from organic materials such as eggshells, wood pulp, rice hulls or materials to improve the biodegradability of the plastic. For example, colorants are mixed with the liquid material to produce a desired color of the finished product. In some examples, colorants are in the form of pellets, powder, or liquid.

Figure 3:
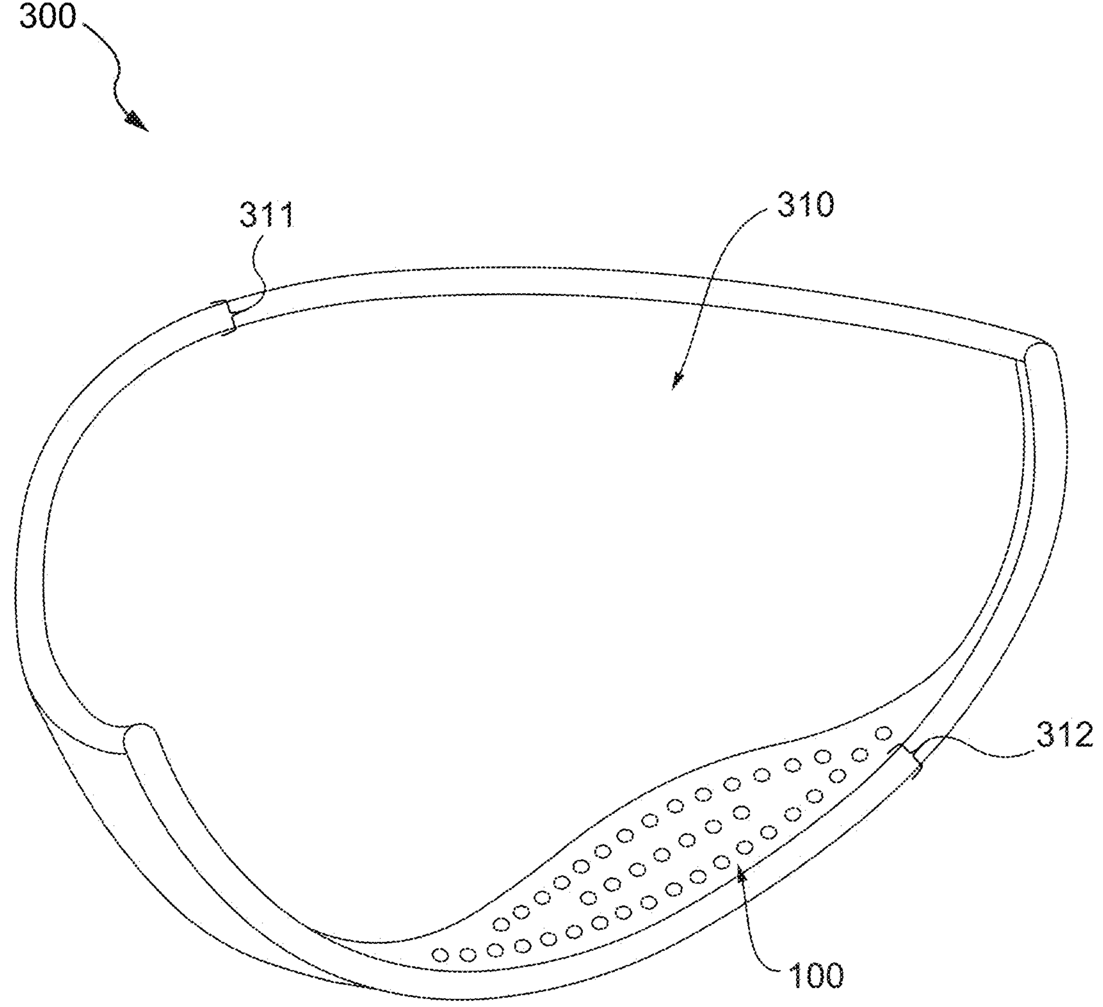
FIG. 3 shows a molded foam cup constructed according to the methodology of FIG. 2A or the methodology of FIG. 2B, according to an embodiment of the present disclosure.

Step 230 of method 200 then provides for, after the liquid material has cooled to form a solid foam (i.e., the liquid material cures into a solid foam), removing the solid foam from the mold. For example, the solid foam is in the shape of molded foam cup 300, as shown in FIG. 3. In some examples, step 230 provides for waiting until the liquid material has cooled to between 80 degrees Celsius and 160 degrees Celsius.

In some examples of method 200, a mold cooling agent is used to further cool down the liquid material. In some examples, a mold cooling agent is used to maintain heating plates of the mold process at an optimal temperature.

In some examples of method 200, a lubrication oil is used on the mold plates before or after the process to reduce wear on the mold plate.

In view of the afore-mentioned disadvantages with conventional injection molding process which can result in improperly formed cups and uneven thickness, under-support 100 enables the disclosed one-shot injection molding method 200, and does not require the additional use of cooling plates. Under-support 100 has a constant thickness

101 throughout its structure, which enables the disclosed one-shot injection molding process 200 without the use of cooling plates.

Figure 2B:
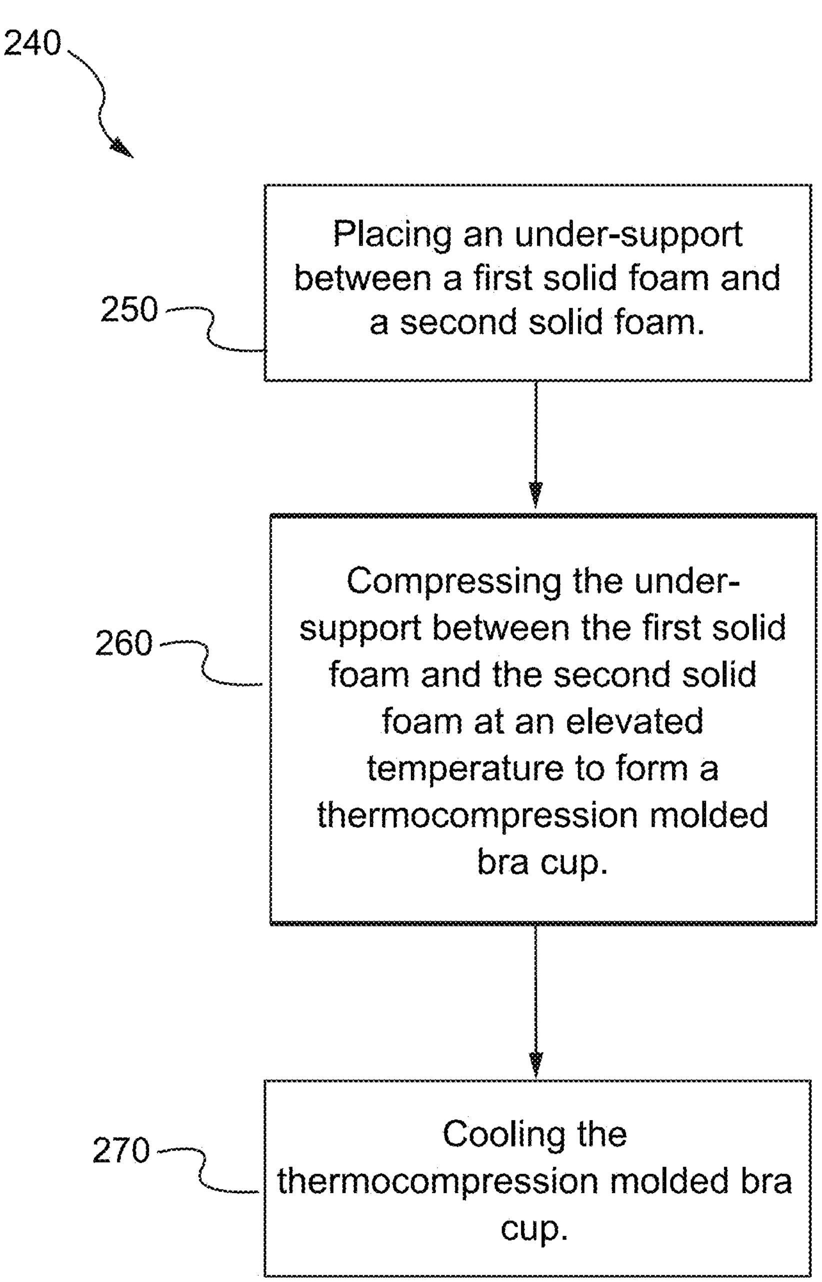
FIG. 2B shows an exemplary methodology, according to an embodiment of the present disclosure.

The present disclosure further provides a method 240 for forming a thermocompression molded bra cup, as shown in FIG. 2B.

Step 250 of method 240 provides for placing an under-support between a first solid foam and a second solid foam. For example, the under-support is under-support 100 as described above. In some embodiments, the first solid foam and second solid foam are not entirely separate foam structures, but are formed by creating a slit or channel in a single piece of foam, and inserting the under-support into the slit or channel.

In some examples, the under-support is made of a polypthalamide, preferably a long alkyl chain polypthalamide. The under-support material has a melt temperature of greater than about 100° C., preferably greater than about 200° C., most preferably greater than about 300° C. For example, the material has a melt temperature of about 310° C. to 340° C. and a mold temperature of 80° C. to 160° C. Therefore, such a material has high melt stability and flowability and is ideal for the disclosed method 240.

Step 260 of method 240 then provides for compressing the under-support between the first solid foam and the second solid foam at a temperature in the range of about 150-250 degrees Celsius. Preferably, the temperature is in the range of about 175-225 degrees Celsius. More preferably, the temperature is in the range of about 190-210 degrees Celsius. In a most preferred embodiment, the temperature is about 200 degrees Celsius.

In some examples of step 260, the thermocompression is conducted by placing the layered materials (comprising the under-support between the first and second solid foams) on top of a heated mold cavity having a bra cup shape. A heated bullet-shape top member presses the layered materials into the cavity, and heat and pressure are maintained until the under-support has been heat sealed between the first and second foams.

In some examples of step 260, the compressed material maintains high heat for several minutes to form a thermocompression molded bra cup. For instance, in some embodiments, the compressed material is heated for a time period of about one to five minutes. In a preferred embodiment, the compressed material is heated for a time period of about two to four minutes. In a more preferred embodiment, the compressed material is heated for a time period of about three minutes.

Step 270 of method 240 then provides for allowing the thermocompression molded bra cup to cool. In some examples, step 270 provides for waiting until the thermocompression molded bra cup has cooled to room temperature.

Methods 200 and 240 provide several advantages over bra molding processes of the prior art. First, previously-disclosed underwire materials, such as plastic composites, metal alloys, polypropylene, epoxy, etc. cannot retain their shape in such heat for such a length of time. Materials that can withstand such heat are typically rigid and heavy. Such materials are not used for bra underwires because bra underwires should allow for some amount of deformation when a sufficient amount of force is applied (e.g., the under-support 100 should bend slightly when the bra is clasped shut, or based on the weight and pressure of breast tissue on the under-support 100 while the wearer is moving). Further, the material should not be heavy to a wearer. Therefore, the systems and methods of the present disclosure utilize materials for the under-support 100 that do withstand the injection molding process 200, and are further wearable to a user. For example, the present disclosure provides for constructing under-support 100 out of a long alkyl chain polypthalamide, which easily withstands heat of 200 degrees Celsius, and only melts at temperatures of 310-340 degrees Celsius. This material is further light and resilient enough to be wearable by a user and allow an appropriate amount of deformation.

Figure 4A:
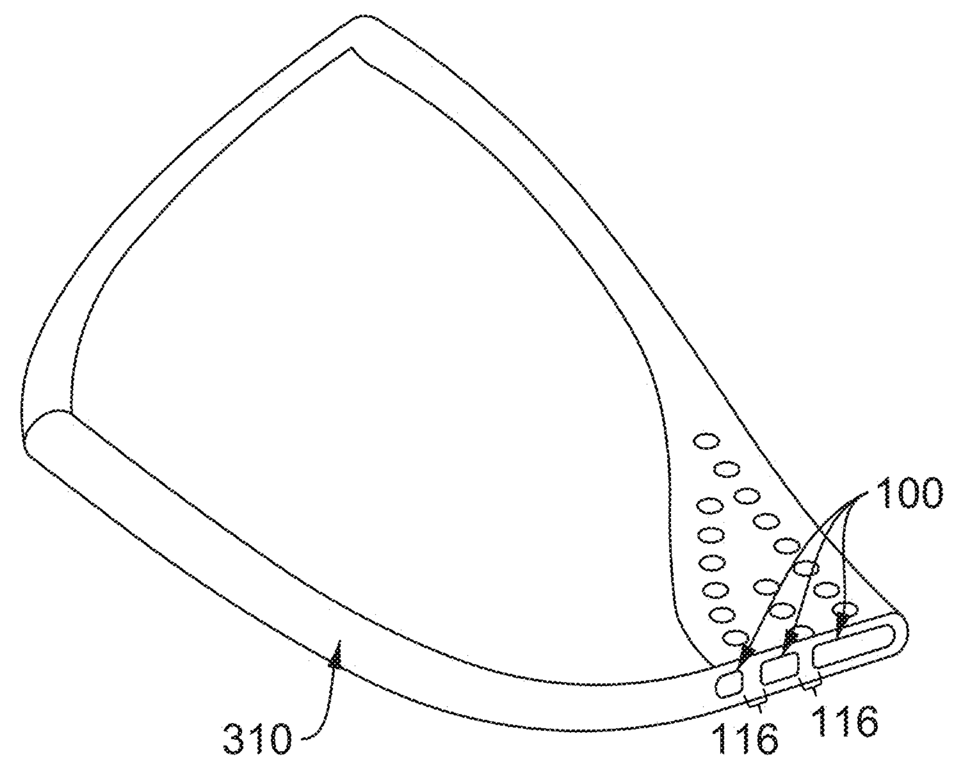
FIG. 4A shows a cut-away view of an exemplary molded foam cup, according to an embodiment of the present disclosure.
Figure 4B:
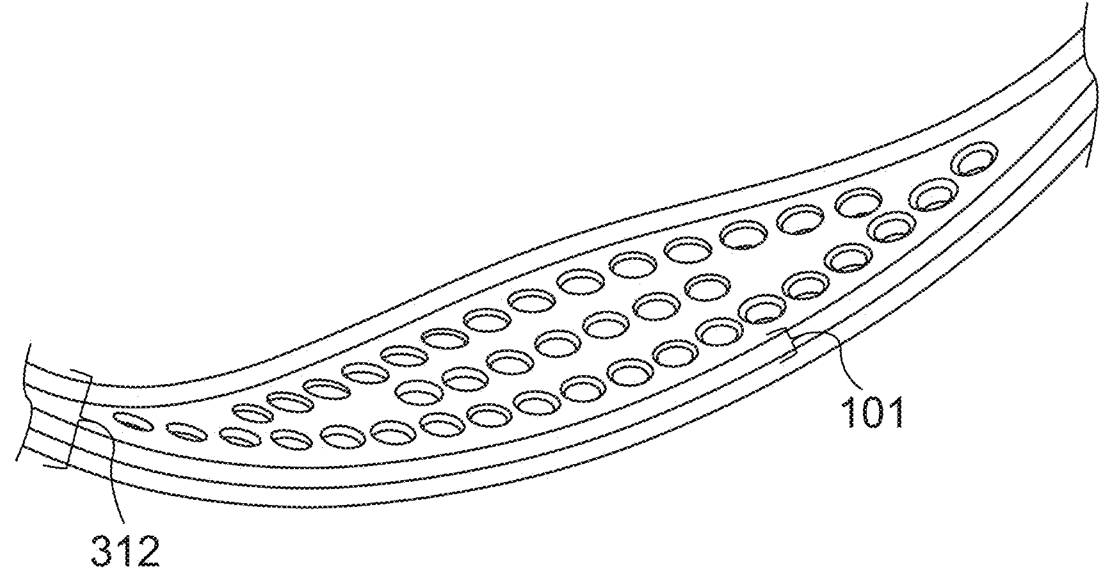
FIG. 4B shows another cutaway view of the molded foam cup, according to an embodiment of the present disclosure.

FIGS. 3 and 4A-4B show exemplary views of molded foam cups, formed in accordance with method 200 of FIG. 2A or method 240 of FIG. 2B. Similar reference labels in any of FIGS. 3-4B refer to corresponding elements. FIG. 3 shows a molded foam cup 300, which includes under-support 100 (e.g., under-support 100 of FIGS. 1A-1C) and foam portion 310. Foam portion 310 fully encapsulates under-support 100. In some examples, a width 312 of the foam cup 300 near the under-support 100 is substantially similar to a width 311 of a top portion of the foam cup 300. In some examples, the width 312 is thicker than the width 311 in order to provide extra padding around the under-support 100.

FIG. 4A shows a cut-away view of a molded foam cup 400. The under-support 100 is shown to be fully integrated with the foam portion 310 as the foam portion extends through the openings 116 of the under-support 100. Therefore, the under-support 100 is fully secured in the foam portion 310 and cannot slide to another position in the foam portion 310.

Methods 200 and 240 provides exemplary implementations of securing the disclosed under-support 100 in a bra cup. The present disclosure further contemplates that the under-support 100 is secured in a bra cup by any of: a compression molding process, gluing or adhering (via a mechanical adhesive and/or a chemical adhesive, or by chemical bonding of the under-support to the foam) the under-support 100 between two pieces of foam, securing the under-support in a channel along a bottom portion of the bra cup, placing the under-support 100 within a slit formed in a solid foam and then sealing the foam around the under-support 100 with heat, adhesive(s), or chemical bonding, and any other method as used for conventional underwires.

While various examples of the present invention have been described above, it should be understood that they have been presented by way of example only, and not limitation. Numerous changes to the disclosed examples can be made in accordance with the disclosure herein without departing from the spirit or scope of the invention. Thus, the breadth and scope of the present invention should not be limited by any of the above described examples. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

I claim:

1. A method of forming a molded bra cup, comprising:

providing an under-support, wherein the under-support includes a first curved end portion, a second curved end portion, and a support portion extending between the first curved end portion and the second curved end portion, wherein the second curved end portion is shaped and configured to extend along a lateral portion of the wearer's chest toward the axilla, wherein the support portion comprises a concave edge, a convex edge, and a plurality of openings throughout the support portion, and wherein the under-support is formed of a single material;

placing the under-support between a first solid foam and a second solid foam;

compressing the under-support between the first solid foam and the second solid foam at a temperature of about 200 degrees Celsius to form a thermocompression molded bra cup; and cooling the thermocompression molded bra cup.

2. The method of claim 1, wherein the step of compressing the under-support between the first solid foam and the second solid foam is maintained for about three minutes.

3. The method of claim 1, wherein the first and second solid foams together fully encapsulate the under-support.

4. The method of claim 1, wherein the first solid foam extends through the plurality of openings.

5. The method of claim 1, wherein the under-support is formed of a material having a melt temperature greater than about 300 degrees Celsius.

6. The method of claim 1, wherein the convex edge has a greater curvature than the concave edge.

7. The method of claim 1, wherein the first curved end portion, the second curved end portion, and the support portion all have substantially similar thicknesses.

8. The method of claim 1, wherein the support portion of the under-support has a largest width at a pole, and wherein a distance from the pole to the second curved end portion is less than a distance from the pole to the first curved end portion.

9. The method of claim 1, wherein the first curved end portion of the under-support and the second curved end portion of the under-support comprise rounded ends.

10. The method of claim 1, wherein the under-support is formed of a polypthalamide.

* * * * *